United States Patent
Howard

[11] 3,747,355
[45] July 24, 1973

[54] PIPELINE SUPPORTED BY BEAMS AND CABLES IN PERMAFROST AREAS

[75] Inventor: George C. Howard, Tulsa, Okla.

[73] Assignee: Amoco Production Company, Tulsa, Okla.

[22] Filed: Mar. 3, 1972

[21] Appl. No.: 231,643

[52] U.S. Cl.................. 61/72.1, 61/36 A, 138/105, 248/49
[51] Int. Cl. ........ F16l 1/00, B63b 35/02, F16l 3/00
[58] Field of Search.................. 61/72.1, 72.5, 72.7, 61/50, 36 A; 138/105, 48; 166/DIG. 1; 248/49

[56] References Cited
UNITED STATES PATENTS

| 3,648,468 | 3/1972 | Bowers | 61/72.1 |
| 2,355,966 | 8/1944 | Goff | 61/72.1 X |
| 3,582,533 | 6/1971 | Albright | 138/105 |

FOREIGN PATENTS OR APPLICATIONS

| 44/1754 | 2/1967 | Japan | 61/72.1 |

OTHER PUBLICATIONS
Oil and Gas Journal, Nov. 16, 1970 pages 153–157 61–36 A

Primary Examiner—Jacob Shapiro
Attorney—Paul F. Hawley and John D. Gassett

[57] ABSTRACT

This invention relates to supporting a pipeline buried in a permafrost area. A trench is dug and the pipe is buried in the usual manner, but the pipe is supported in the trench by a beam resting on the surface perpendicular to the trench with cables running from the pipe to the beam. The ends of the support beam may rest on a berm, pad, or float.

3 Claims, 4 Drawing Figures

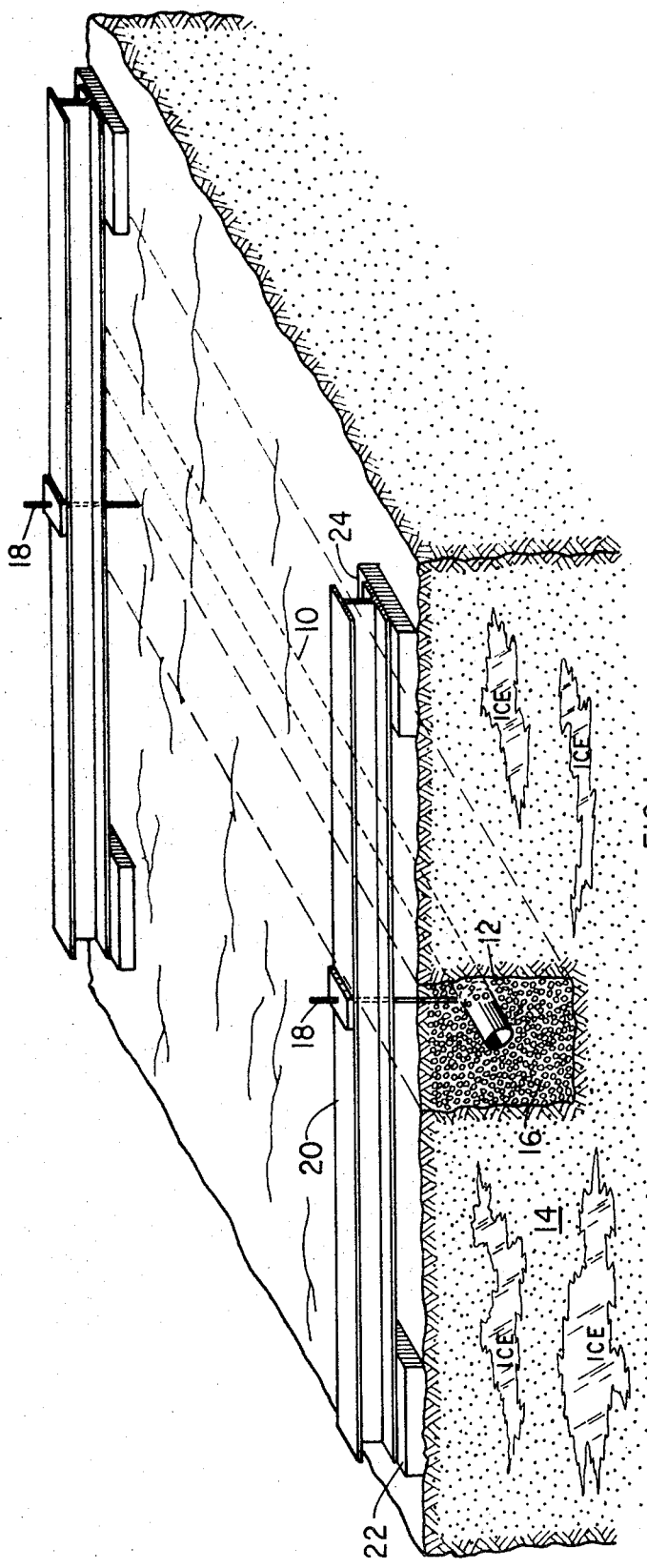
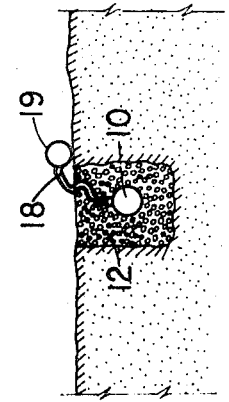
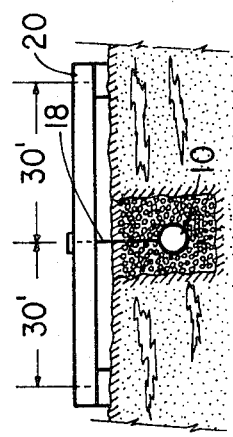
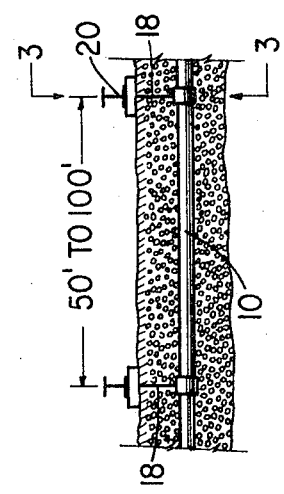

PIPELINE SUPPORTED BY BEAMS AND CABLES IN PERMAFROST AREAS

BACKGROUND OF THE INVENTION

Field of the Invention

This invention relates to a method of laying a pipeline in permafrost in an Arctic area.

Setting of the Invention

Recently, oil and gas have been found in the Arctic area of the North American continent. Huge quantities of oil have been discovered in the Alaskan North Slope area. The oil must be transported from the wells on the North Slope to southern markets. One of the most common ways of transporting oil is by the use of pipelines. Most of the area in the Arctic area is covered with a surface and subsurface condition called permafrost, which varies in thickness from a few feet to several thousand feet. This permafrost or frozen ground is frequently found in gravel, rock, clay, etc. The ice may occupy up to 90 percent of the space. The water throughout this permafrost remains frozen except that ordinarily the upper 3-5 feet thaws in the summer and becomes very unstable. A pipeline could be laid in trenches deeper than this thaw zone; however, there would still be the problem of providing a stable pipeline when transporting oil. The reason for this is that in order to pump the oil through the pipeline, the oil must be maintained at a temperature considerably above that at which ice melts. Thus, heat lost from the fluid flowing through the pipeline is such that in permafrost having high ice content, it continues to melt the permafrost and allows the pipe to sag and eventually break.

Prior Suggestions for Solving the Problem

Some people have attempted to solve this problem of the melting of the permafrost and the sagging of the pipeline by first cooling the gas or liquid to be transported through the pipeline to below the freezing point of water and then transporting it through the pipeline in a cooled state. This, of course, is a very expensive method of handling the problem. It is also nearly impossible to pump some grades of crude oil if the crude oil is cooled below the freezing point of water.

Another suggestion for supporting a warm pipeline in an Arctic region is described in U.S. Pat. No. 3,613,380. That patent suggests laying pipe on spaced supports extending away from the pipeline into the solidly frozen permafrost. This method will apparently do what it is intended to do, but the whole process must be carried out when the pipeline is laid; if not, a considerable amount of excavation will have to be done later. In some permafrost areas the ice content is sufficiently low so that there is virtually no danger of subsidence of the pipeline due to heat loss; on the other end of the spectrum, there is permafrost with such high ice content that it is virtually a certainty that the pipeline, if not properly supported, will suffer subsidence from heat loss and eventually break when oil is pumped through the pipeline. There is a permafrost area between these two extremes which is in the gray area. That is, it is most difficult to accurately predict in advance whether the heat loss will cause subsidence. Thus, in the gray area the patentee will have to go ahead and bury his supports in this gray area or take a chance that the pipeline will not subside; and if subsidence does occur, he will have to re-excavate and relay or repair the pipeline.

It is thus seen that the laying of a pipeline and its operation in permafrost areas presents many problems. There are proposed answers, but they are all costly. It is thus seen that there is a need for more economical solutions. This present invention described in this application provides such a solution.

BRIEF DESCRIPTION OF THE INVENTION

This invention relates to a method of constructing a pipeline in an area in which the surface is comprised of permafrost. A pipeline is laid in a trench dug in the permafrost. A cable is attached to the pipeline and extends above the trench where it is attached to a beam on the surface of the earth which is laying perpendicular to the trench. The ends of the beams are supported by either pontoons or by pads, which insulate the permafrost so that the permafrost supporting the pads does not melt during the summer. In those areas where it is questionable as to whether subsidence will occur, a cable is attached to the pipeline and its upper end extends above the earth or fill of the trench and is left free. If subsequent surveys of the pipe-line indicate subsidence, then beams are placed in position over the pipeline and the cables attached thereto. If no subsidence occurs, then the cables are merely left free.

BRIEF DESCRIPTION OF THE DRAWINGS

Various objectives and a better understanding can be had of the invention by the following descriptions taken in conjunction with the drawings in which:

FIG. 1, partly in perspective, illustrates a pipeline laid in a trench and supported by a cable attached to the transverse beam;

FIG. 2 illustrates a cutaway view illustrating spacing of the cables along the pipeline;

FIG. 3 illustrates a section taken along the line 3—3 of FIG. 2;

FIG. 4 illustrates a free cable attached to the buried pipeline.

DETAILED DESCRIPTION OF THE INVENTION

Attention is first directed to FIG. 1 which illustrates a pipe-line 10 which is buried in a trench 12 which has been dug in permafrost 14. Trench 12 has been filled with material 16, which ordinarily would be the permafrost that was originally removed therefrom. Trench 12 will ordinarily be dug during the time at which the surface of the permafrost is frozen. The reason for this is that transportation, moving of ditch diggers, etc., is much easier at this time. A cable 18 is attached to pipe 10 and extends above trench 12 to a beam 20. The ends of beam 20 are supported by means 22 and 24. These end supports can be either gravel berm, pads or pontoons. If pads are used, then it is preferred that the permafrost surface under the pads be insulated to prevent melting in the summer. This can be easily accomplished, for example, by placing 2-3 feet of gravel on the permafrost. If pads 22 are concrete and of sufficient size, e.g., 6 by 6 by 3 feet thick or more, then there will be very little melting of the permafrost directly under the pads. Thus, the pads will remain supported throughout the year. If desired, pads 22 can be supported on a gravel berm, which is a conventional way of insulating the permafrost to keep it from melting.

An alternate means of constructing support means 22 and 24 is to construct them as pontoons. The pontoons are thus connected to beam 20 forming a pontoon unit. If pontoons are used, the pontoon unit connected to each cable 18 should have a positive buoyancy in water equal to the negative buoyancy of a section of pipeline in water, having a length equal to the distance between support cables 18.

It is to be noted that the dimension of the pontoons, their distance from the trench, strength, etc., will vary upon various engineering considerations. However, some typical dimensions may be helpful in more fully understanding the invention. Pipeline 10 can be any selected size; however, it is believed that the longest contemplated pipeline in the North Slope area that crosses permafrost regions will be about 48 inches in diameter. For a 48 inch pipe, trench 12 will typically be about 5 feet wide and 10 feet deep.

The size of pipeline 10 and the temperature of the fluid flowing through it will largely control the distance through the permafrost which will be affected by heat loss. It has been estimated that for a 48 inch pipeline, flowing typical crude from the North Slope at a rate of 2,000,000 bpd, estimated pipeline flowing temperature of 145°F, the heat loss over a 50-year period will not affect any permafrost which is beyond 30 feet on either side of the pipeline. These distances are illustrated in FIG. 3.

It is further estimated that for a 48 inch line, support cables 18 will be attached every 50-100 feet. This is illustrated in FIG. 2. Engineering considerations such as the thickness of the walls of pipe 10, the type materials, and the diameter of the pipeline, will determine the distance or spacing of cables 18.

As mentioned above, some permafrost areas have high ice content, e.g., about 90 percent by volume. It is known in these areas that subsidence of the pipeline carrying warm fluids will occur, unless special support means are provided. In other areas having very low ice content, e.g., <10 percent by volume, that subsidence due to heat loss will not be a problem. In the gray area between these two conditions, there is an area of permafrost that may or may not be sufficiently disturbed by heat loss as to cause subsidence. It is difficult to determine in these areas whether subsidence will be a problem. This is true, despite the fact that many coreholes may be drilled along the proposed path of the pipeline before it is laid. Here is the way I propose to handle this problem. I will lay pipeline 10 in trench 12 as shown in FIG. 4. I will attach cable 18 to the pipeline at its lower end and the upper end is free or attached to a buoy or marker 19. I merely leave the upper end of cable 18 laying on the surface. When pipeline 10 is laid, surveys are made so that the angle of each section of the pipe is known. After the pipeline has been in operation for simetime, I run a surveying tool through the pipeline. Such surveying tools are commercially available, one such tool is a LINALOG, built by the AMF Tuboscope Company. This surveying tool gives the angle of inclination along the entire length of the pipe surveyed. If the angle of inclination changes from that of the original survey, then I know that subsidence of the pipeline is occurring at that location. I correct this situation very quickly. I proceed to the point of trouble and attach the upper end of cable 18, which has been lying free at that point, to a beam 20 which has end supports 22 and 24 and which was described above in conjunction with FIG. 1. This effectively stops the subsidence of pipeline 10 at that particular trouble point. Other points in the questionable area may not have suffered subsidence so I will not attach the more expensive beam 20 and its end supports to the already previously installed cable 18. It is to be noted that the few feet of cable 18 required at each location is a very inexpensive item compared to the overall cost of the pipeline. In other words, this is very inexpensive insurance for those troubled areas.

While the above desciption has been made in detail, various modifications can be made thereto without departing from the spirit or the scope of the invention.

I claim:

1. A method of constructing a pipeline in an area whose surface comprises permafrost which includes:
    digging a trench in said permafrost;
    laying a pipeline in said trench;
    attaching an elongated member to said pipeline, said elongated member extending above said trench;
    filling said trench;
    attaching said elongated member to a beam on the surface of the earth laying transverse to said trench;
    supporting the ends of said beams on pontoons, each set of pontoons for each said beam having a positive bouyancy in water equal to the negative bouyancy of a section of said pipeline in water having a length equal to the distance between said elongated members.

2. A method as defined in claim 1 in which there are a plurality of elongated members placed along said pipeline at a distance in the range of from 50-100 feet.

3. A method of constructing and operating a pipeline in those areas in which the earth's surface is predominantly permafrost which comprises:
    digging a trench in said permafrost;
    laying a pipeline at known positions and inclinations in said trench;
    attaching a plurality of spaced apart elongated members to spaced apart points along said pipeline, said elongated members extending to above the surface;
    filling said trench;
    transporting fluid through said pipeline;
    running a survey on said pipeline at various intervals of time to determine the angle of inclination of the pipeline along its length so that the thus measured angles of inclination can be compared with the angles of inclination of the pipeline when first laid so that subsidence of the pipeline can be detected;
    attaching the upper end of said elongated member at each section of pipe when subsidence is detected to a beam supported at the surface across said pipeline.

* * * * *